W. T. MERRITT.
Feathering Paddle-Wheel.

No. 216,208. Patented June 3, 1879.

3 Sheets—Sheet 2.

W. T. MERRITT.
Feathering Paddle-Wheel.

No. 216,208. Patented June 3, 1879.

Attest:
F. H. Schott.
D. F. Cowl

Inventor:
Wm T. Merritt

3 Sheets—Sheet 3.

W. T. MERRITT.
Feathering Paddle-Wheel.

No. 216,208. Patented June 3, 1879.

Attest:
F. H. Schott.
D. P. Cowl.

Inventor:
Wm. T. Merritt

UNITED STATES PATENT OFFICE.

WILLIAM T. MERRITT, OF POUGHKEEPSIE, NEW YORK.

IMPROVEMENT IN FEATHERING PADDLE-WHEELS.

Specification forming part of Letters Patent No. 216,208, dated June 3, 1879; application filed April 15, 1879.

*To all whom it may concern:*

Be it known that I, WILLIAM T. MERRITT, of Poughkeepsie, in the county of Dutchess and State of New York, have invented certain new and useful Improvements in Paddle-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of paddle-wheels used in propelling vessels which are known by the name of "feathering paddle-wheels," and in which the paddles or buckets of the wheel enter and leave the water perpendicularly, thus preventing the great waste of power in wheels with fixed buckets or paddles, which, by their entering and leaving the water in an inclined position, cause great loss—first, by their lifting action, which tends to raise the vessel from the water, and, secondly, by their tendency to deprees the vessel and throw up the water as they leave it, all the power used in this way being wholly lost for the purpose of propulsion.

The principal object aimed at in the present invention is to so arrange the buckets upon the arms of the wheel that they shall enter the water perpendicularly, then naturally moving with it until they have arrived at a point where the power may be effectively applied without loss, and to leave the water in the same way that they enter it—that is, with its natural flow—thus preventing loss of power and the great disturbance of the surface of the water so injurious to the banks of rivers and canals, as well as dangerous to small craft when in the vicinity of a passing steamboat; and the invention consists in the pivoting of the paddles or buckets to the arms of the wheel, and controlling their position by means of sliding stops and cams or inclines, as will be hereinafter fully set forth, and then specifically stated in the claims.

Figure 1:
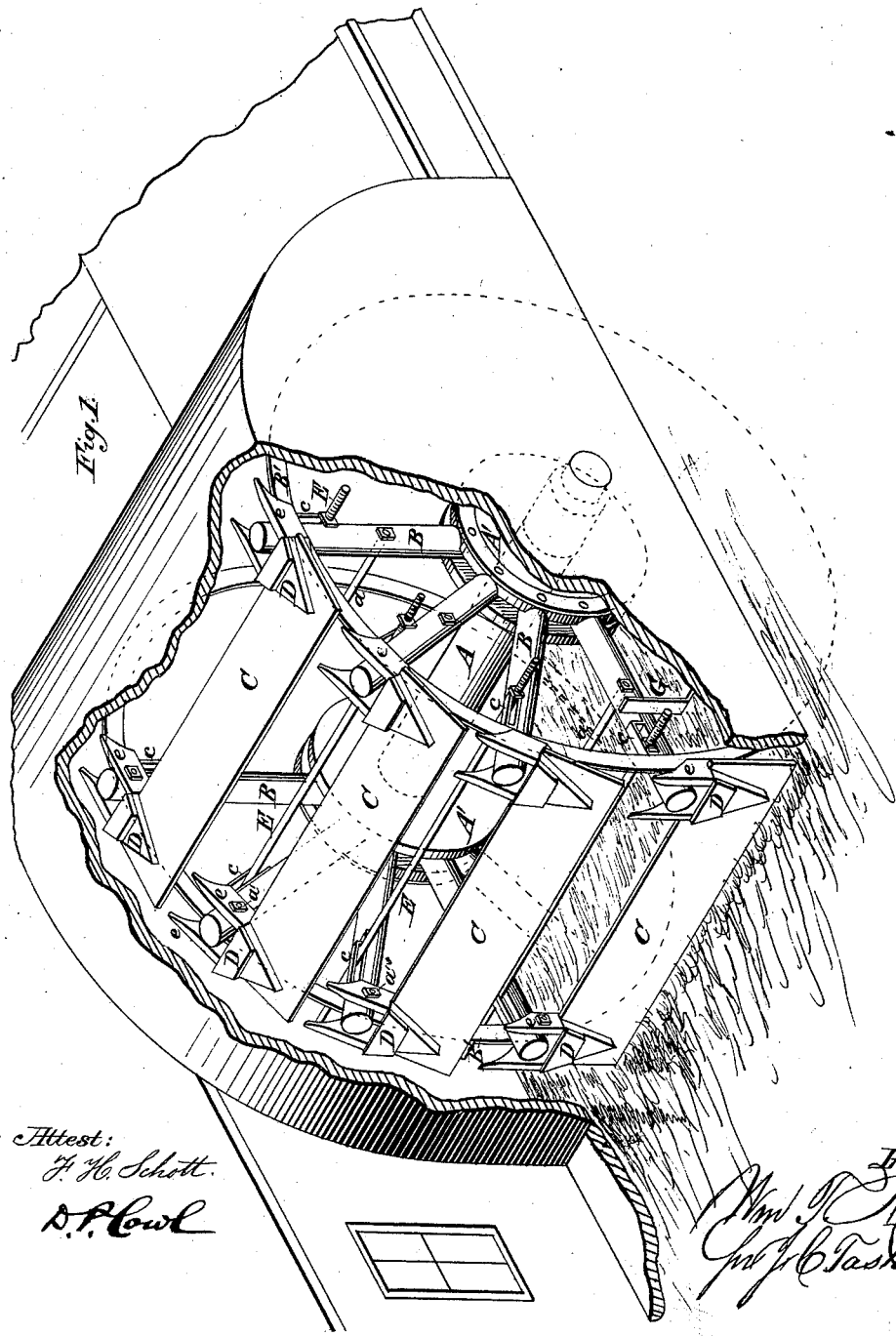
Figure 2:
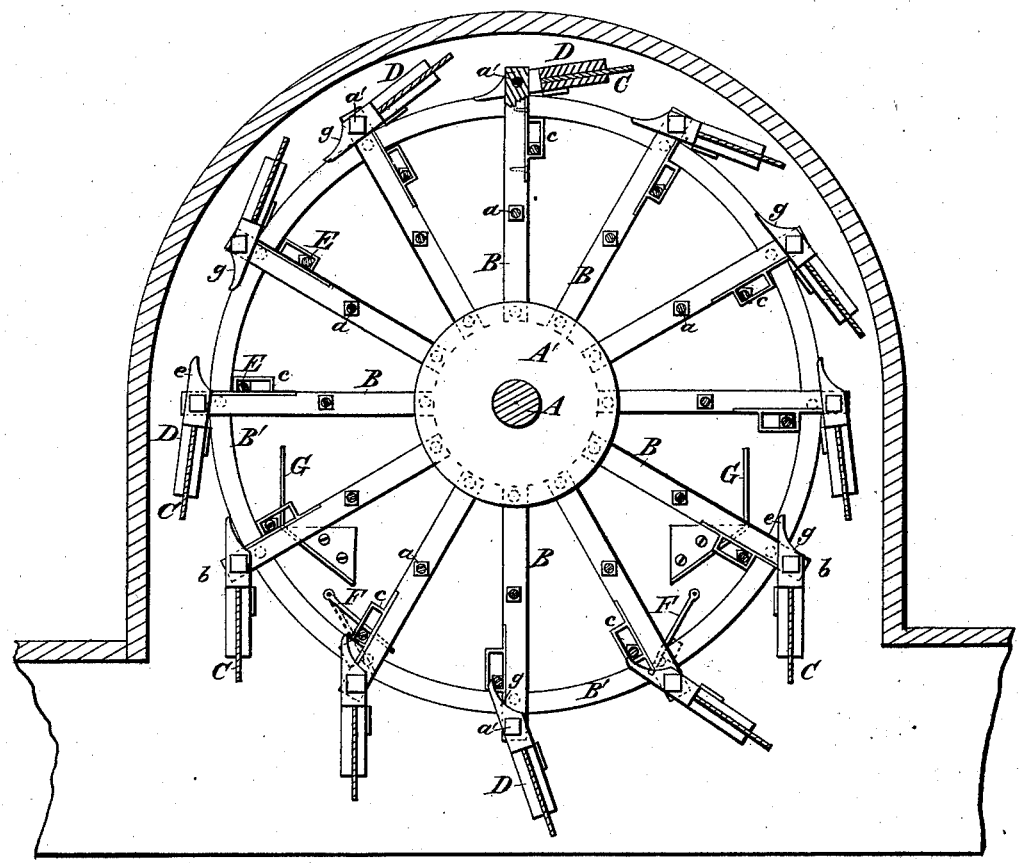
Figure 3:
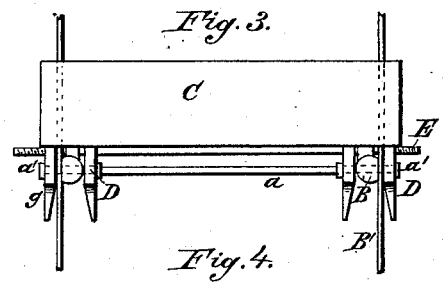
Figure 4:
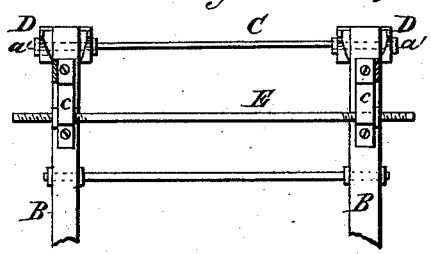
Figure 5:
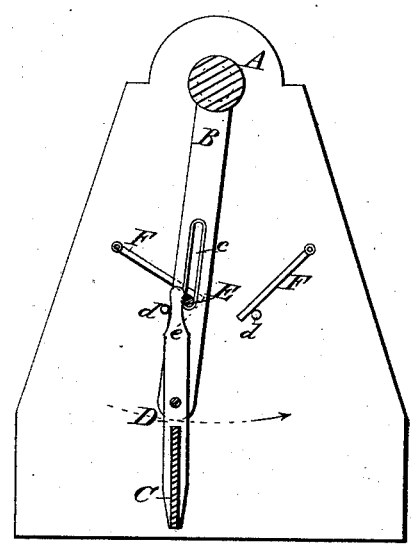
Figure 6:
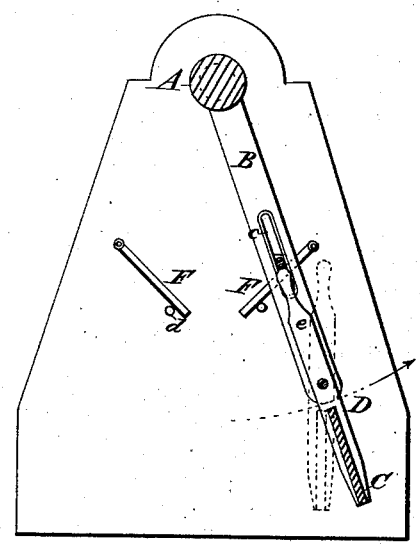
Figure 7:
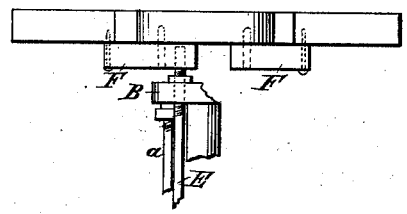
Figure 8:
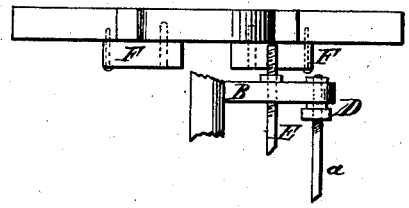

Figure 1 is a perspective view of one side of a vessel provided with the improved wheel, a portion of the paddle-box being broken away to show the wheel in its interior. Fig. 2 is a vertical section through the paddle-box and wheel, showing the position taken by the buckets when the wheel is in operation. Fig. 3 is a detail view, showing one of the buckets at right angles to the arms of the wheel. Fig. 4 is another view of the devices shown in Fig. 3. Fig. 5 shows another form of arranging the devices which control the position of the buckets, the latter being in position to propel the vessel. Fig. 6 is another view of the devices shown in Fig. 5, the dotted lines showing the bucket released from control, as when entering or leaving the water. Figs. 7 and 8 are detail plans of the devices shown in Figs. 5 and 6.

In constructing this wheel, the shaft A is provided with the necessary flanges A' to hold the arms B, of which there may be two or more sets, as the size of the wheel and length of the buckets may make expedient. These arms B are connected to each other near their outer ends by the circular rims B', to which each arm of a set is bolted, and cross-braces *a* are made to connect the sets of arms, so as to give the wheel lateral stiffness. It will be obvious that this method of bracing may be varied as circumstances and the size of the wheels shall require.

The buckets C are provided with the projecting pieces or brackets D, which are firmly secured to each end of the buckets, and may have bifurcated extremities *e*, which embrace the ends of each arm B. These brackets D are each pivoted to the arms by a bolt, *a'*, which passes through both bracket and arm, forming a hinge-joint, upon which the bucket, when not otherwise restrained, moves freely, thus allowing it to swing and occupy a vertical position as it descends into or rises out of the water, the weight of the bucket causing it to depend from the arm in a vertical position, as shown at *b* in Fig. 2 of the drawings, when not otherwise controlled.

Placed in a slot formed in or bolted directly to each arm of the wheel is the metallic guideway *c*, in which is placed the sliding latch-bar E, which, as the wheel revolves, drops to the lower ends of the guideway and forms a stop, against which the extension *e* of the brackets D bear when the wheel-buckets become immersed in water and begin to do their work;

but, as the wheel continues to revolve, the ends of these latch-bars are caught upon the swinging inclines F and raised so as to free the ends e of the brackets from the latch-bars and allow the bucket to assume a vertical or such other direction as the current of water through which the wheel is passing may give to it, thus allowing it to leave the water with but a slight disturbance of its surface and without lifting any considerable portion of it above its level.

When the guideways c are placed upon the side of the arms B and the brackets hinged at the middle of the arm, it becomes necessary to bevel or bend the ends of the brackets, as shown at g, Fig. 2, so that the bucket shall maintain a proper position when held by the latch-bar both in backing and going ahead. These hinged inclines F are preferably placed in pairs at both sides of the wheel, so as to act upon both ends of the latch-bar simultaneously, and these pairs are also duplicated by others placed in a reverse position, so that there shall be a pair of inclines to act when backing as well as when going ahead. The pivots upon which the inclines are hung allow them to rise and allow the latch-bar to pass under them when the wheel moves in one direction, but to catch it and raise it out of contact with the ends e of brackets D when the movement of the wheel is reversed, the inclines being prevented from falling too far after the passage of the latch-bar by stops d, secured in proper positions.

Guides G may be placed in such a position as to insure the falling of the latch-bars into the proper position to catch the brackets; but it is believed that the force of gravity, except in exceptional cases, will be sufficient to accomplish this result without the use of these guides.

In Figs. 5 and 6 of the drawings the buckets are shown as being provided with brackets having a straight extension part, e, and with the slide c, which forms the guide for the latch-bar placed in a slot in the center of the arms of the wheel. This method of construction causes the buckets to have the same angle with relation to the arms of the wheel when the latter is moving in either direction without beveling or bending the extension e of the bracket, thus simplifying the construction of these parts, and at the same time retaining their efficiency.

Having thus described my invention, I claim as new, and desire to secure by Letters Patent, the following:

1. In a propelling-wheel for vessels, the buckets provided with brackets D, hinged to the wheel-arms, in combination with the sliding latch-bars E, operating by gravity, for the purpose of retaining the floats in position for transmitting the power without loss in propelling the vessel, as set forth.

2. The wheel-arms provided with guides c, in combination with the sliding latch-bars and self-acting buckets having hinged brackets D, with extension-arms e engaging with the latch-bars in the manner specified.

3. In a propelling-wheel for vessels, the combination of the hinged inclines F with the sliding latch-bars E, for the purpose of releasing the buckets in the manner set forth.

4. The guides G and hinged inclines F, in combination with the sliding latch-bars, the wheel-arms, and the feathering-buckets C, all constructed and arranged for joint action, substantially as and for the purpose specified.

In testimony that I claim the foregoing I have hereunto set my hand and seal this 4th day of April, 1879.

WM. T. MERRITT. [L. S.]

Witnesses:
 ARTHUR L. FROST,
 STEPHEN G. GUERNSEY.